United States Patent [19]
Wilkening

[11] Patent Number: 5,112,175
[45] Date of Patent: May 12, 1992

[54] SCREW HOLE PLUG

[75] Inventor: Steven R. Wilkening, Wyoming, Mich.

[73] Assignee: ODL, Incorporated, Zeeland, Mich.

[21] Appl. No.: 609,605

[22] Filed: Nov. 6, 1990

[51] Int. Cl.$^5$ ............................................. F16B 43/00
[52] U.S. Cl. ..................................... 411/371; 411/377; 411/429
[58] Field of Search ............... 411/429, 430, 431, 371, 411/372, 373, 377, 910; 52/514

[56] References Cited

U.S. PATENT DOCUMENTS

| | | | |
|---|---|---|---|
| 264,776 | 9/1882 | Sharp | 411/372 X |
| 293,726 | 2/1884 | Fancher | 52/514 |
| 3,298,272 | 1/1967 | Henderson | 411/910 X |
| 3,377,633 | 4/1968 | Waldon | 411/373 X |
| 3,551,922 | 1/1971 | Watson | 411/373 |
| 4,394,096 | 7/1983 | Stevens | 411/373 X |
| 4,537,543 | 8/1985 | Scott et al. | 411/427 X |

FOREIGN PATENT DOCUMENTS

| | | | |
|---|---|---|---|
| 1393446 | 2/1965 | France | 411/107 |
| 925314 | 5/1963 | United Kingdom | 411/373 |

Primary Examiner—Rodney M. Lindsey
Attorney, Agent, or Firm—Warner, Norcross & Judd

[57] ABSTRACT

The specification discloses a one-piece injection-molded screw hole plug fitting over a screw head to aesthetically close a screw hole. The element defining the screw hole and the top of the screw hole plug have nonplanar, but mating, contours so that the molding and plug define a generally continuous surface. Preferably, the screw hole plug friction fits within the screw hole and over the screw head to retain the plug in position.

9 Claims, 3 Drawing Sheets

SCREW HOLE PLUG

BACKGROUND OF THE INVENTION

The present invention relates to screw hole plugs, and more particularly to a plug adapted for installation within a limited depth screw hole through a nonplanar surface.

Many structural elements, such as moldings, have screw holes. Typically, the screw holes are formed before the screws are inserted and include a countersink creating a shoulder. The head of a screw seats against the shoulder and is recessed below the molding surface. Such screw holes are unsightly and aesthetically unattractive. The screw holes interrupt the smooth flow of the exposed surface.

One prior approach to reducing the unsightliness of screw holes is to make the countersunk portion of the screw hole as shallow as possible. However, these reduced depth screw holes have defied prior attempts to create a screw hole plug suitable for installation therein.

SUMMARY OF THE INVENTION

The aforementioned problems are overcome by the present invention wherein a screw hole plug is provided which friction fits within the countersink and frictionally grips the screw head located within the countersink. The plug includes a circumferential wall fitting within the screw hole and over the screw head. The plug further preferably includes a top having a profile matching the exposed surface of the structural element. Consequently, the installed screw hole plug is flush with the surface.

The present invention provides a simple yet effective screw hole cap for virtually any type of countersunk screw head. Especially when preferably made by injection molding, the plug is inexpensive and readily suited to mass manufacture.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 6:
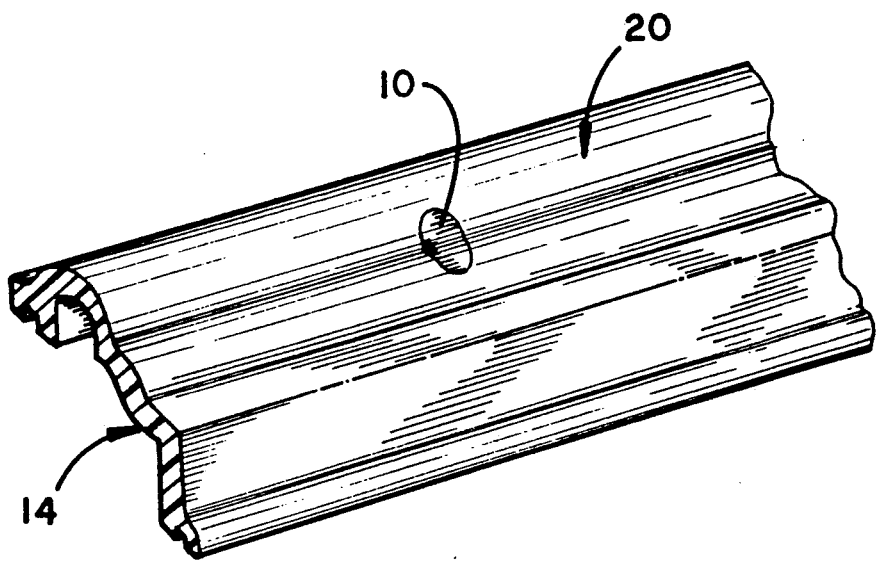
FIG. 6 is a fragmentary perspective view similar to FIG. 1, but showing the components assembled.

The screw hole plug of the present invention is illustrated in the drawings and generally designated 10. As perhaps best illustrated in FIG. 2, the screw hole plug is friction fitted into the countersink 12 in a molding 14 to also frictionally grip the head 16 of the screw 18. The resultant assembly is illustrated in FIG. 6 wherein it is readily seen that the screw hole plug and molding 14 provide a generally continuous exposed surface.

Figure 1:
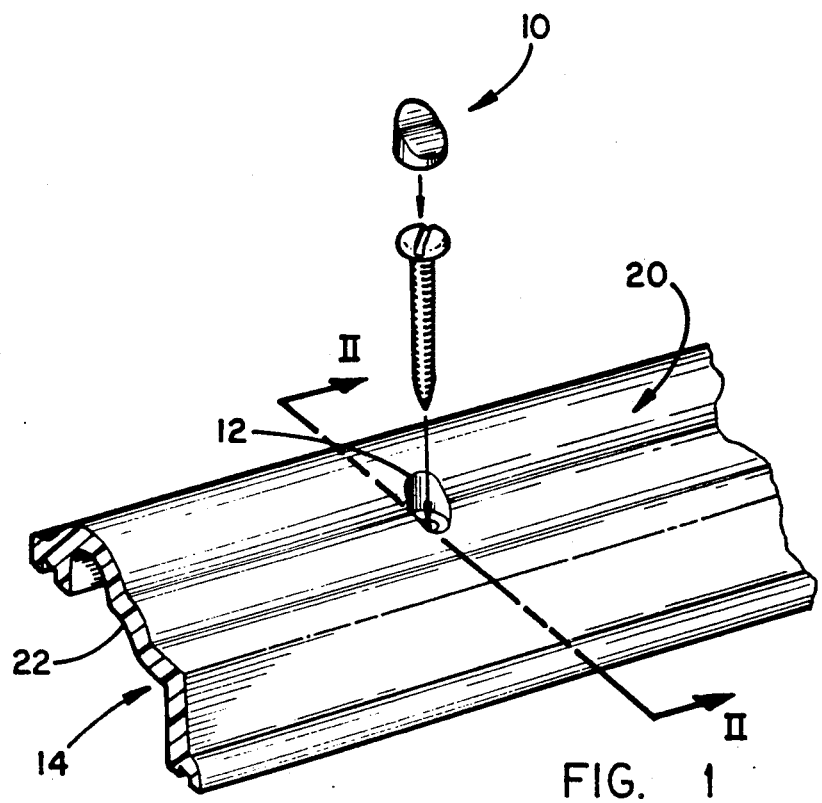
FIG. 1 is a fragmentary exploded perspective view of a molding assembly including the screw hole plug of the present invention.

The molding 14 in which the screw hole plug 10 is mounted is generally well known to those having ordinary skill in the art. Such moldings are used by the assignee of the present application to provide framing elements for door lights. These moldings are injection molded of high heat, high impact grade polystyrene. The molding 14 has a generally uniform wall thickness as seen in FIGS. 1 and 6. The molding 14 includes an exposed surface 20 having a curvilinear or other nonplanar configuration or shape in cross-section. The shape of the exposed surface is selected for aesthetic reasons and will vary from molding to molding.

Figure 2:
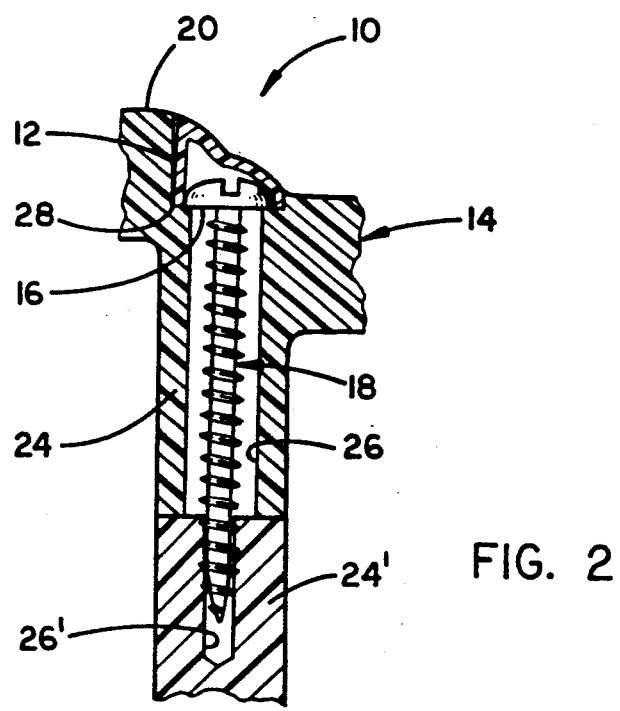
FIG. 2 is a sectional view taken alone line II—II through the assembled components of FIG. 1.

As seen in FIG. 2, the molding 14 includes a plurality of screw bosses 24 on its underside 22. Only one such screw boss is illustrated in FIG. 2, but the bosses are provided at spaced locations. The screw boss defines a generally centrally located screw hole 26. A similar screw boss 24' of a mating molding piece defines a screw hole 26' of smaller diameter to secure the screw as will be described. As seen in FIGS. 1 and 2, the screw hole is generally aligned with the screw boss 24 and extends through the exposed surface 20 of the molding 14. The upper portion of the screw hole is a countersink 12 having a diameter larger than the remainder of the screw hole 26. The juncture of the countersink 12 and the screw hole 26 creates a shoulder 28 against which the screw head seats as will be described.

A conventional pan head screw 18 extends through the screw hole 26 to interconnect the two moldings. The threaded shaft of the screw 18 is smaller in diameter than the screw hole 26 so that the threads do not grip the screw boss 24. However, the diameter of opposing screw hole 26' is selected so that the screw 18 will bite into the opposing screw boss 24' to intersecure the two molding pieces. The head 16 of the screw 18 seats on the shoulder 28 so that the head is located within the countersink 12 below the exposed surface 20. The molding 14 and the screw 18 are generally well known to those having skill in the doorlight art.

Figure 3:
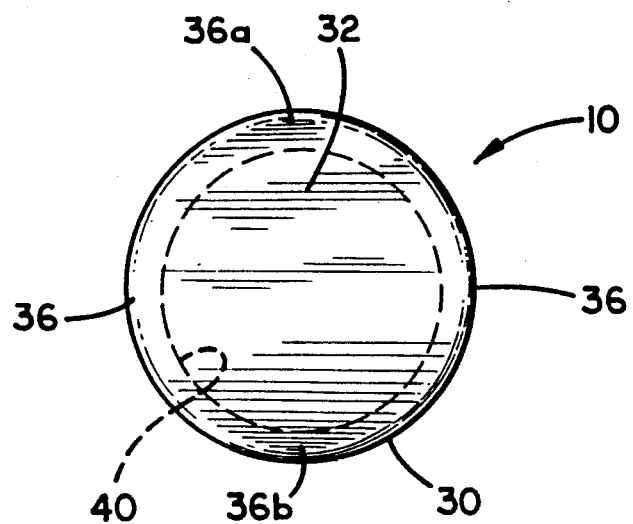
FIG. 3 is a top plan view of the screw hole plug.
Figure 4:
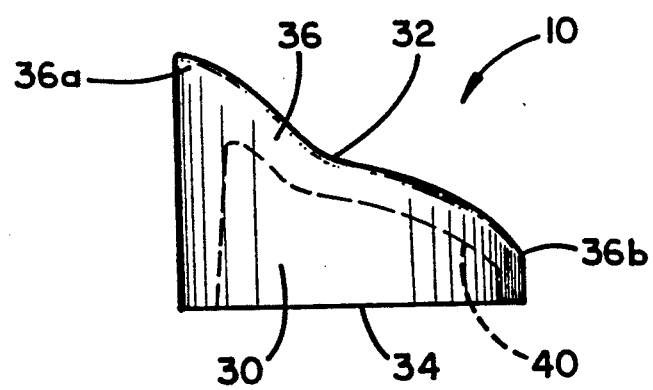
FIG. 4 is a side elevational view of the screw hole plug.
Figure 5:
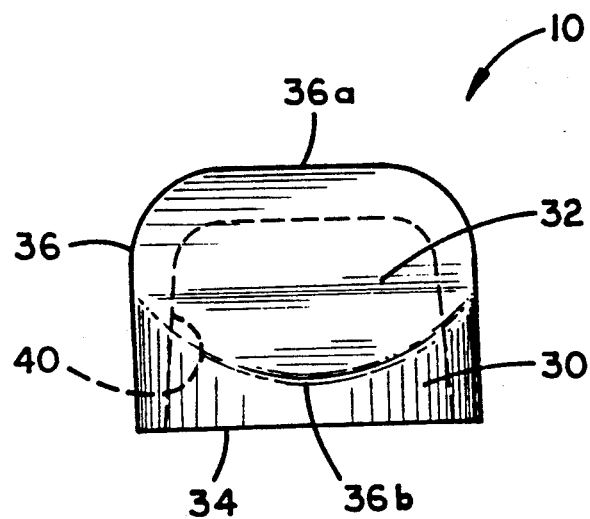
FIG. 5 is a front elevational view of the screw hole plug.

The screw hole cap 10 is illustrated in greatest detail in FIGS. 3-5. Generally speaking, the plug has a cylindrical side wall 30 and a curvilinear top wall 32. The cylindrical side wall 30 includes a lower edge 34 defining a plane generally perpendicular to the axis of the cylindrical side wall. The outer surface of the side wall 30 defines a circular cylinder having a diameter only slightly larger than the diameter of the countersink 12. Consequently the side wall 30 friction fits within the countersink 12. The inner surface of the side wall 30 is slightly tapered having its largest diameter at the opening to the cavity 40. This largest diameter is slightly smaller than the diameter of the screw head 16 so that the side wall frictionally grips the screw head. The side wall 30 also includes an upper edge 36 having a high portion 36a and a low portion 36b.

The top wall 32 is curvilinear in side elevational profile as illustrated in FIG. 4. The curvilinear shape of the side wall 32 matches the curvilinear shape or configuration of the exposed molding surface 20. The top wall 32 is connected to the entire upper peripheral edge 36 of the cylindrical side wall 30. The side wall 30 and top wall 32 therefore together define a cavity 40 receiving the screw head 16.

The plug or cap 10 is preferably injection molded. In the presently preferred embodiment, the cap is molded of high heat, high impact grade polystyrene resin such as that sold as No. 825 by Fina Oil & Chemical Company of Dallas, Tex. (White Colorant #71-1170-1 by Ferro Corporation of Schaumburg, Ill.). The preferred wall thickness is 0.040 inch. Graining, such as to similate oak wood, or other surface texture can be molded into the top wall 32 as desired to match any graining or surface texture provided in the molding surface 20.

In use, the screw hole plug 10 is inserted after the screw 18 is installed to intersecure the molding pieces. Specifically, the screw 18 is inserted and tightened as desired so that the screw head 16 seats against the shoulder 28 to provide the desired intersecuring force between the molding pieces. The screw hole plug 10 is then inserted into the countersink 12 of the screw hole. The angular orientation of the cap 10 is selected so that the nonplanar top wall 32 of the plug 10 is aligned with the nonplanar surface 20 of the molding 14. The outer surface of the side wall 30 frictionally fits within the countersink 12 to at least partially secure the cap in position. The inside surface of the side wall 30 fits over and frictionally grips the head of the screw to further retain the cap 10 in position. Consequently, the cap will be operative in a screw hole or countersink of only limited depth.

FIG. 6 shows the molding 14 with the screw cap 10 properly installed. As can be seen, the screw hole plug 10 provides a continuous surface with the exposed surface 20 of the molding to provide an aesthetically pleasing appearance.

It should be understood that the above description is that of a preferred embodiment of the invention. Various alterations and changes can be made without departing from the spirit and broader aspects of the invention as set forth in the appended claims, which are to be interpreted in accordance with the principles of patent law, including the doctrine of equivalents.

I claim:

1. An assembly with a covered screw hole comprising:
    an element having a nonplanar exposed surface and defining a hole extending through said exposed surface;
    a fastener extending through said hole and having a head located within said hole below said exposed surface; and
    a fastener hole cap fabricated of a resiliently deformable material, said cap including a cylindrical side wall having a nonplanar upper edge, said cap further including a top wall connected to the entire periphery of said upper edge, said cap being located within said fastener hole, said circumferential side wall and said top wall defining a cavity, said cylindrical side wall frictionally fitting within said hole and frictionally gripping and encircling said fastener head, said cap having a top exposed surface being nonplanar in a manner generally identical to said exposed surface of said element in the area of said fastener hole, whereby said fastener hole cap is generally flush with said element.

2. An assembly as defined in claim 1 wherein said side wall and said top wall being an integral single piece.

3. An assembly as defined in claim 1 wherein said top surface of said cap is curvilinear in profile.

4. An assembly as defined in claim 1 wherein the texture of said top cap surface and said exposed element surface are generally identical.

5. An assembly comprising:
    an element having an exposed surface and defining a screw hole extending through said surface, said element defining a shoulder within said screw hole below said exposed surface;
    a screw located within said screw hole, said screw having a head seated on said screw hole shoulder, said screw head being located below said exposed surface; and
    a screw hole plug fabricated of a resiliently deformable material, said screw hole plug being frictionally received within said screw hole and located between said shoulder and said exposed surface, said screw hole plug including a circumferential wall having a nonplanar upper edge and a top wall connected to the entire periphery of said upper edge, said side wall and said top wall defining a cavity in which said screw head is received, said circumferential wall frictionally fitting within said screw hole and frictionally gripping said screw head.

6. An assembly as defined in claim 5 wherein said circumferential wall and said top wall comprise an integral single-piece construction.

7. An assembly as defined in claim 5 wherein said element and said top of said screw hole plug are nonlinear in profile and flush with one another.

8. An assembly as defined in claim 5 wherein said exposed element surface and said top of said plug both include graining.

9. A screw hole plug comprising:
    a cylindrical circumferential side wall having a lower edge defining a plane generally perpendicular to the axis of the circumferential wall and a nonplanar upper edge; and
    a top wall connected to the entire periphery of the upper edge of the circumferential wall, said top wall and said side wall together defining a cavity for receiving a screw head, said top wall being nonplanar.

* * * * *